United States Patent
Choi et al.

(10) Patent No.: US 9,793,817 B2
(45) Date of Patent: Oct. 17, 2017

(54) MULTIPLE OUTPUT CONVERTER AND METHOD FOR CONTROLLING THE SAME

(71) Applicant: Foundation of Soongsil University-Industry Cooperation, Seoul (KR)

(72) Inventors: Woojin Choi, Seoul (KR); Long Tran Van, Seoul (KR)

(73) Assignee: Foundation of Soongsil University-Industry Cooperation, Seoul (KR)

( * ) Notice: Subject to any disclaimer, the term of this patent is extended or adjusted under 35 U.S.C. 154(b) by 232 days.

(21) Appl. No.: 14/767,567

(22) PCT Filed: Jun. 26, 2014

(86) PCT No.: PCT/KR2014/005685
§ 371 (c)(1),
(2) Date: Aug. 12, 2015

(87) PCT Pub. No.: WO2015/072645
PCT Pub. Date: May 21, 2015

(65) Prior Publication Data
US 2015/0381067 A1    Dec. 31, 2015

(30) Foreign Application Priority Data
Nov. 14, 2013 (KR) .................. 10-2013-0138062

(51) Int. Cl.
*H02M 3/335* (2006.01)
*H02M 1/00* (2006.01)

(52) U.S. Cl.
CPC ...... *H02M 3/33561* (2013.01); *H02M 3/3353* (2013.01); *H02M 2001/009* (2013.01)

(58) Field of Classification Search
USPC ....................................... 327/32, 36–38, 40
See application file for complete search history.

(56) References Cited

U.S. PATENT DOCUMENTS 5,442,534 A    8/1995    Cuk et al.
5,617,015 A    4/1997    Goder et al.
(Continued)

FOREIGN PATENT DOCUMENTS

CN    1525632 A    9/2004
DE    10259353 A1    7/2004
(Continued)

OTHER PUBLICATIONS

Joung-Hu Park et al. "The Single PWM Multi-Output Converter with an Arbitrary Number of Output Regulation", KIEE, 2009 Spring Conference, Papers of Electrical Machinery and Energy Conversion systems Division Part, Apr. 23, 2009 pp. 121-124.

*Primary Examiner* — An Luu
(74) *Attorney, Agent, or Firm* — Novick, Kim & Lee, PLLC; Sang Ho Lee

(57) ABSTRACT

A multiple output converter is provided. The multiple output converter includes a power conversion circuit and a switching control unit. The power conversion circuit includes an input unit having at least one first switch, a transformer unit configured to convert a magnitude of power from the input unit, an output unit having a plurality of output terminals, which are configured to receive the power from the transformer unit, and a second switch unit having a plurality of second switches, wherein each of the plurality of second switches is installed in each of the plurality of output terminals, respectively, and is controlled in a time division multiple control manner. The switching control is configured to transmit a pulse width modulation signal to the at least one first switch and the plurality of second switches for controlling the at least one first switch and the plurality of second switches in the time division multiple control manner.

8 Claims, 6 Drawing Sheets

(56) References Cited

U.S. PATENT DOCUMENTS

| | | | |
|---|---|---|---|
| 8,194,426 B2* | 6/2012 | Duvnjak | H02M 3/33561 363/21.1 |
| 9,041,345 B2* | 5/2015 | Choi | H02J 7/0016 320/107 |
| 2007/0121350 A1 | 5/2007 | Duvnjak | |
| 2008/0231115 A1 | 9/2008 | Cho et al. | |

FOREIGN PATENT DOCUMENTS

| | | |
|---|---|---|
| EP | 0164144 A1 | 12/1985 |
| JP | 2000-032753 A | 1/2000 |
| KR | 10-2006-0083162 A | 7/2006 |
| KR | 10-2009-0076330 A | 7/2009 |
| KR | 10-2010-0005898 A | 1/2010 |
| KR | 10-2010-0027018 A | 3/2010 |

* cited by examiner

Mode 1

Mode 2

Mode 3

Mode 4

MULTIPLE OUTPUT CONVERTER AND METHOD FOR CONTROLLING THE SAME

BACKGROUND

The following description relates to a multiple output converter which can provide voltages having different levels to a plurality of output units, and a method of controlling the same.

A switching power supply device is a power supply device for generating a constant voltage by switching a direct current (DC) voltage using a pulse width modulation (PWM) control. Since the switching power supply device performs the PWM control by feeding a change of a load back, the switching power supply device can generate the constant voltage despite of the change of the load, and since the switching power supply device performs a switching operation using a relatively high frequency (dozens to hundreds of KHz), a size of an inductive or capacitive component such as a transformer or a condenser, etc. can be reduced, and thus the switching power supply device is currently being used as a power supply device for many electronic products.

Accordingly, in a DC-DC converter of the switching power supply device used in the electronic products requiring multiple power (for example, 5V, 12V, 24V, etc.), the multiple power should be output in a plurality of output terminals, and the plurality of output powers should be simultaneously provided according to the electronic product which is used.

The present invention is directed to providing a multiple output converter which can independently control a plurality of output terminals of a converter using a time division multiple control method, and a method of controlling the same.

SUMMARY OF THE DISCLOSURE

One aspect of the present invention provides a multiple output converter, including: a power conversion circuit including an input unit including a first switch, a transformer unit configured to convert a magnitude of input power applied through the input unit, an output unit including a plurality of output terminals provided so as to receive the power applied through the transformer unit, and a second switch unit including a plurality of second switches which are installed in the plurality of output terminals, respectively, and are controlled by a time division multiple control method; and a switching control unit configured to transmit a pulse width modulation signal to the first switch and the second switch so as to control the first switch and the second switch by the time division multiple control method.

The multiple output converter may further include a feedback circuit unit configured to detect voltages of the plurality of output terminals and transmit the detected voltages to the switching control unit so as to independently perform a feedback control on the plurality of output terminals included in the output unit.

When voltage information on the plurality of output terminals is received through the feedback circuit unit, the switching control unit may control the first switch and the plurality of second switches by the time division multiple control method according to the voltage information, and independently compensate power of a corresponding output terminal.

At least one first switch may be provided and the plurality of second switches may be provided, and the switching control unit may perform the time division multiple control method by synchronizing the first switch with the plurality of second switches in one sampling period.

The switching control unit may operate the first switch at a frequency fs, and when there are n second switches, operate each switch at a frequency fs/n, and control the powers of the plurality of output terminals connected to the plurality of second switches during one period.

When the number of the second switches is n, the switching control unit may sequentially control the second switches by a time period Ts, and independently control the second switch at a N time period nTs.

Another aspect of the present invention provides a multiple output converter, including: an input unit including at least one first switch; a transformer unit configured to convert a magnitude of power applied through the input unit; and an output unit including a plurality of independent output terminals which receive the power through the transformer unit and in which the applied power is output, and wherein each of the plurality of independent output terminals includes a second switch which is individually driven, and is synchronized with a pulse width modulation (PWM) control of the first switch and is controlled by a time division multiple control method.

An independent output terminal included in the output unit may be connected by commonly sharing the input unit, and the output terminal which receives the power converted through the transformer unit may be determined by an operation of the second switch.

The multiple output converter may further include a feedback circuit unit configured to detect the power of each of the plurality of independent output terminals so as to independently control magnitudes of the powers of the plurality of output terminals.

Still another aspect of the present invention provides a method of controlling a multiple output converter including an input unit including at least one first switch, a transformer unit configured to convert a magnitude of power applied through the input unit, and a plurality of second switches which receive the power applied through the transformer unit and are installed in a plurality of output terminals in which the applied power is output, the method, including: sequentially constructing a closed circuit of the output terminal and the transformer unit by controlling the plurality of second switches by a time division multiple control method; and differently forming the magnitude of the power applied through the plurality of second switches of each time by controlling in association with the first switch when controlling the plurality of second switches by the time division multiple control method.

According to the aspects of the present invention, the plurality of output terminals provided in the multiple output converter may be conveniently, exactly, and independently controlled.

DETAILED DESCRIPTION OF EXEMPLARY EMBODIMENTS

Figure 1:
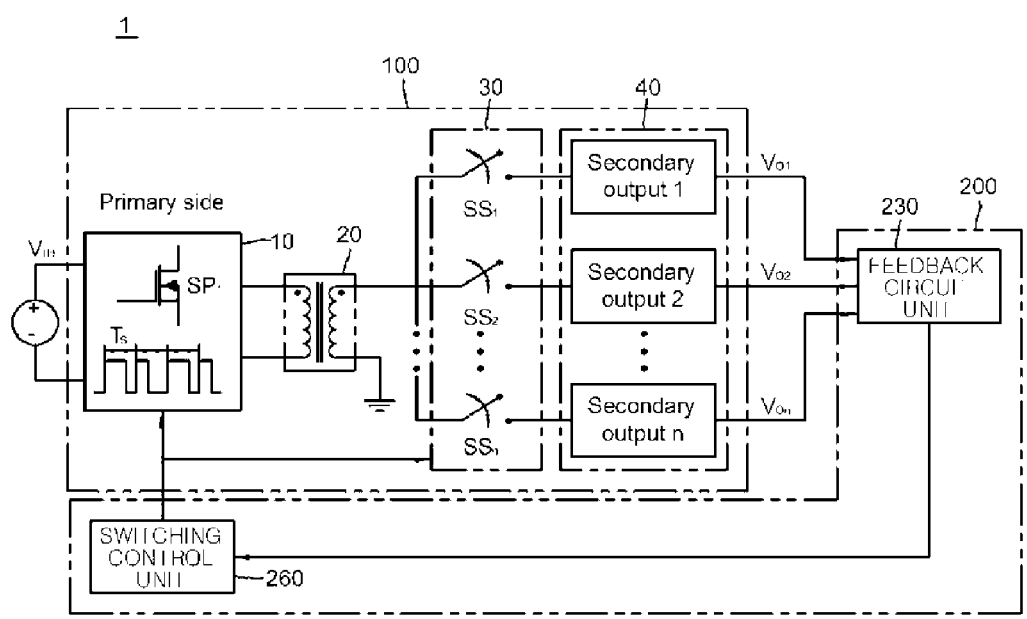
FIG. 1 is a block diagram illustrating a multiple output converter according to an exemplary embodiment of the present invention.

Hereinafter, a multiple output converter and a method of controlling the same according to embodiments of the present invention will be described below in more detail with reference to the accompanying drawings. When adding reference numerals in elements of each drawing, if possible, a like reference numeral will be used for a like element even though the like element is shown in another drawing.

Figure 2:
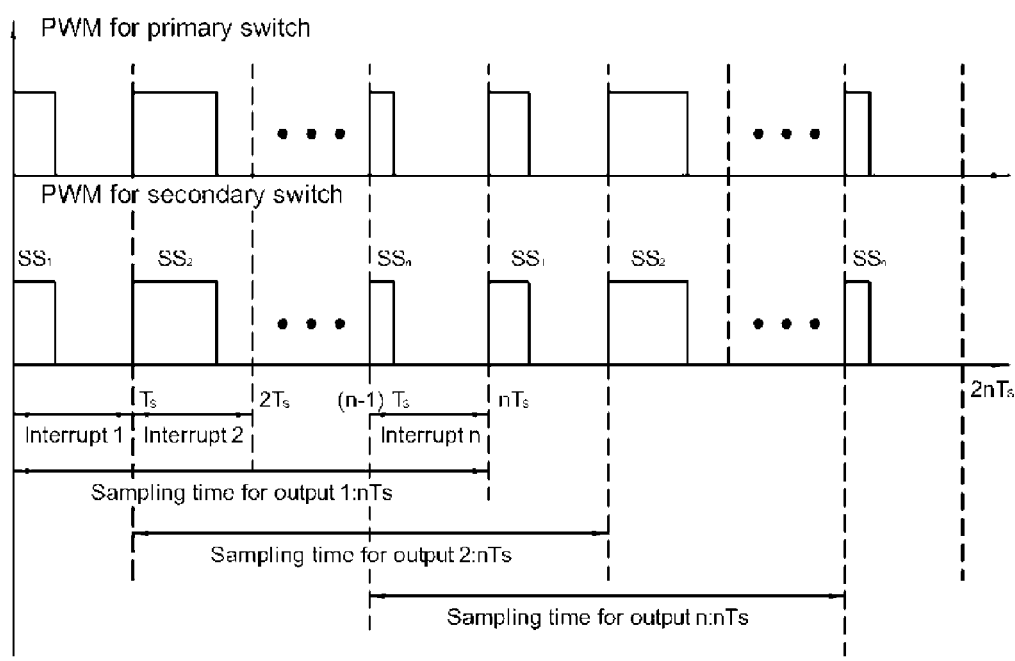
FIG. 2 is a diagram illustrating an example of a pulse width modulation signal which is applied to a multiple output converter according to an exemplary embodiment of the present invention.

FIG. 1 is a block diagram illustrating a multiple output converter according to an exemplary embodiment of the present invention, and FIG. 2 is a diagram illustrating an example of a pulse width modulation signal which is applied to a multiple output converter according to an exemplary embodiment of the present invention.

A multiple output converter 1 may include a power conversion circuit 100, and a control circuit 200.

The power conversion circuit 100 may include an input unit 10, a transformer unit 20, a second switch unit 30, and an output unit 40.

The input unit 10 may include a first switch $SP_1$, and the number of the first switch $SP_1$ may be at least one. The input unit 10 may receive power through an input direct current power, receive a pulse width modulation (PWM) signal from the control circuit 200, and transmit the input direct current power to the transformer unit 20 according to the PWM signal.

The transformer unit 20 may output converted power by converting (increasing or decreasing a voltage) the input power, and include a primary coil and a second coil which have a turns ratio of n:1.

The second switch unit 30 may include a plurality of second switches $SS_1, SS_2, \ldots, SS_n$ so as to switch the input power applied through the transformer unit 20 and transmit it the output unit 40. The plurality of second switches $SS_1, SS_2, \ldots, SS_n$ of the second switch unit 30 may be turned on or off by a time division multiple control method according to a control signal applied through the control circuit 200.

The output unit 40 may include a plurality of output terminals (second output 1, second output 2, . . . , second output n), and the plurality of output terminals may be connected to the plurality of second switches $SS_1, SS_2, \ldots, SS_n$, respectively, included in the second switch unit 30, and receive output voltages by the time division multiple control method.

The control circuit 200 may include a feedback circuit unit 230 and a switching control unit 260.

The feedback circuit unit 230 may detect voltages output from the plurality of output terminals of the power conversion circuit 100, and provide them to the switching control unit 260. The feedback circuit unit 230 may control the voltages output from the plurality of output terminals by the time division multiple control method, transmit each of them to the switching control unit 260 to have time difference, and constantly maintain the output voltage of each of the plurality of output terminals Second output 1, Second output 2, . . . , Second output n included in the output unit 40.

The switching control unit 260 may transmit a switching signal to the input unit 10 and the second switch unit 30 of the power conversion circuit 100, and control a switching operation of each of them.

The switching control unit 260 may control the input unit 10 and the second switch unit 30 by the time division multiple control method. According to the time division multiple control method, the switching control unit 260 may perform a PWM control on the first switch $SP_1$ included in the input unit 10 at a frequency fs, and perform the PWM control on each of n switches included in the second switch unit 30 at a frequency fs/n. According to the time division multiple control method, voltages on every output terminal connected to the second switch unit 30 may be controlled during N time period nTs, and each of the plurality of output terminals included in the output unit 40 may be independently controlled during one switching period Ts. Further, each switch included in the second switch unit 30 may be sequentially turned on by being synchronized with the PWM control of the first switch $SP_1$ during one individual switching period. Accordingly, every output terminal of the output unit 40 may be individually controlled within one sampling period.

Referring to FIG. 2, when n switches are included in the second switch unit 30, the switching control unit 260 may perform the PWM control on the first switch $SP_1$ during the N time period nTs, and control all of second switches $SS_1, SS_2, \ldots, SS_n$ included in the second switch unit 30 during the N time period nTs by sequentially turning on each of second switches $SS_1, SS_2, \ldots, SS_n$ included in the second switch unit 30 over one sampling time Ts. Thus, all output terminals (second output 1, second output 2, . . . , second output n) connected to each of the second switches $SS_1, SS_2, \ldots, SS_n$ included in the second switch unit 30 may be individually controlled.

Figure 3:
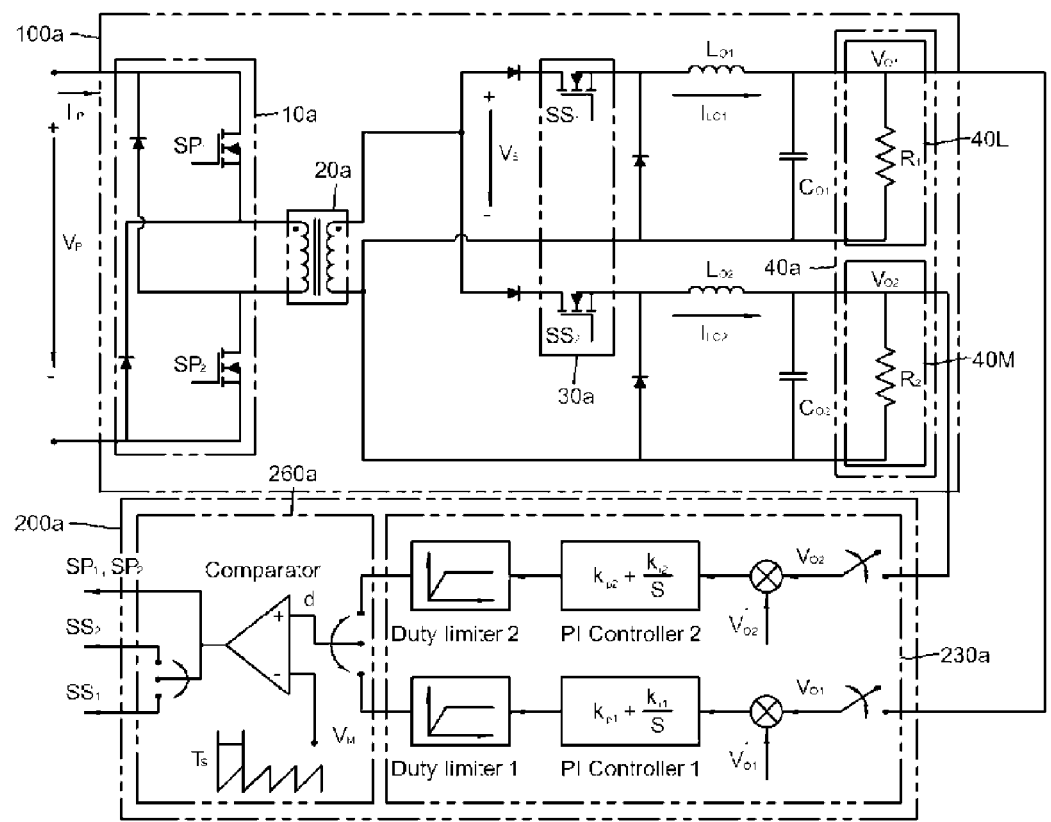
FIG. 3 is a circuit diagram illustrating a multiple output converter according to an exemplary embodiment of the present invention.
Figure 4A:
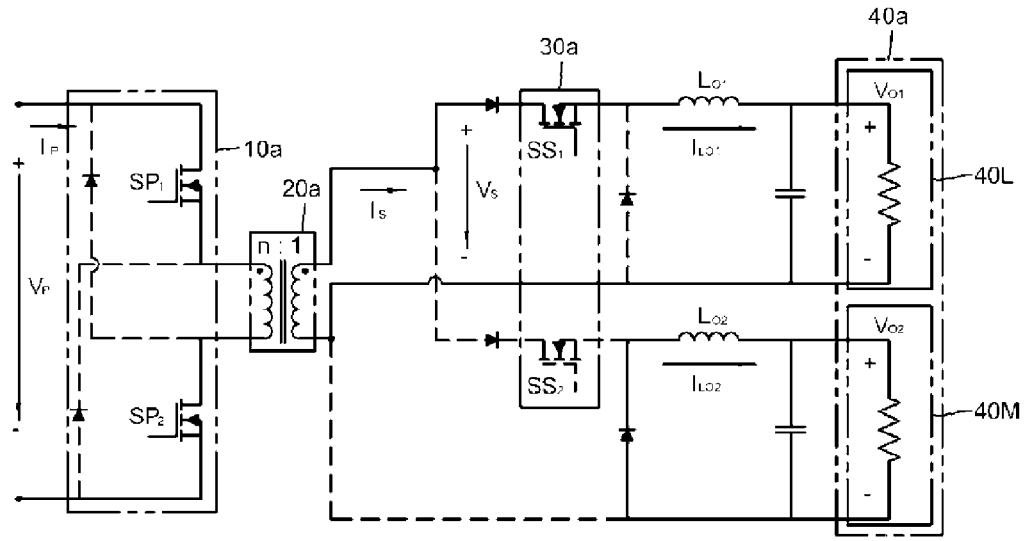
FIGS. 4A to 4D are diagrams illustrating an operation mode of the multiple output converter shown in FIG. 3.
Figure 4B:
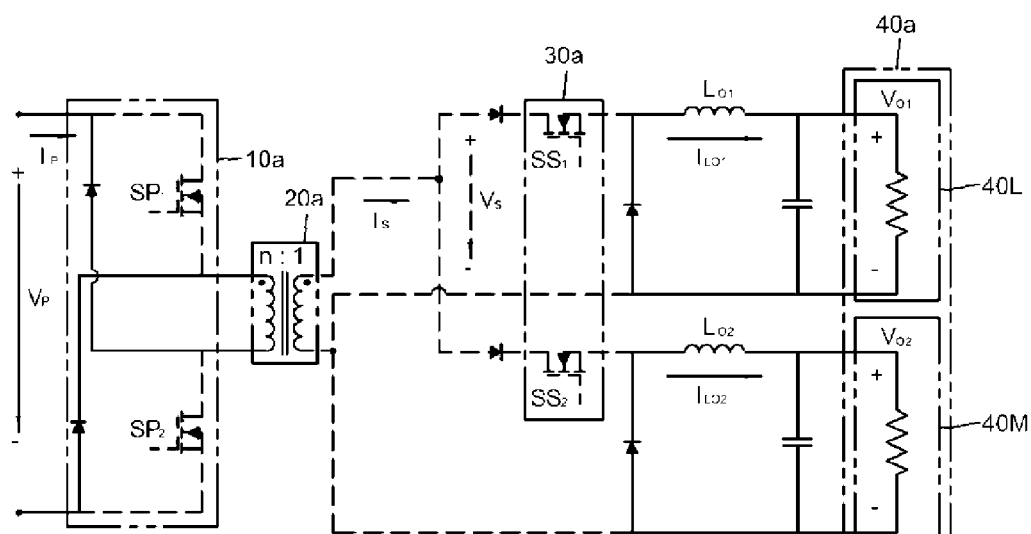
Figure 4C:
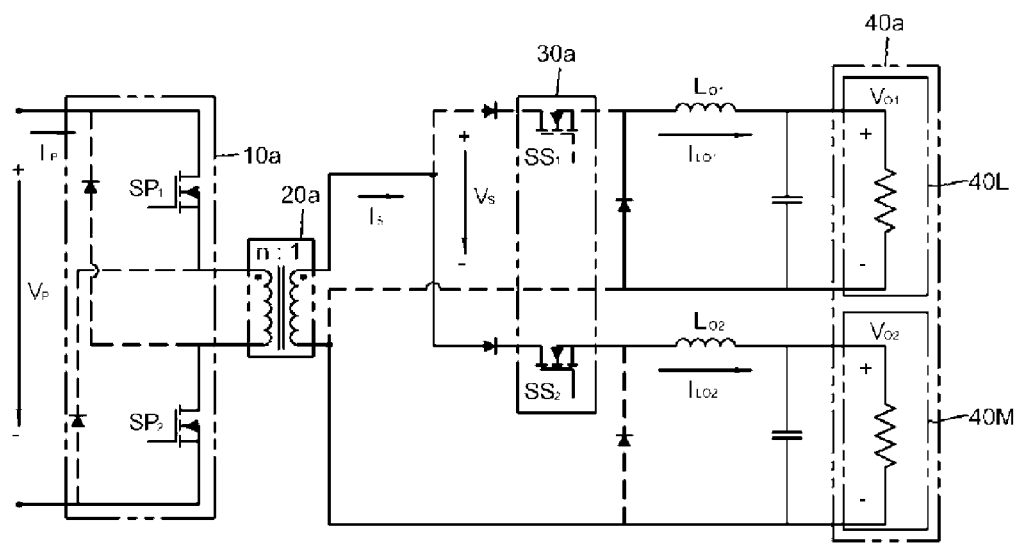
Figure 4D:
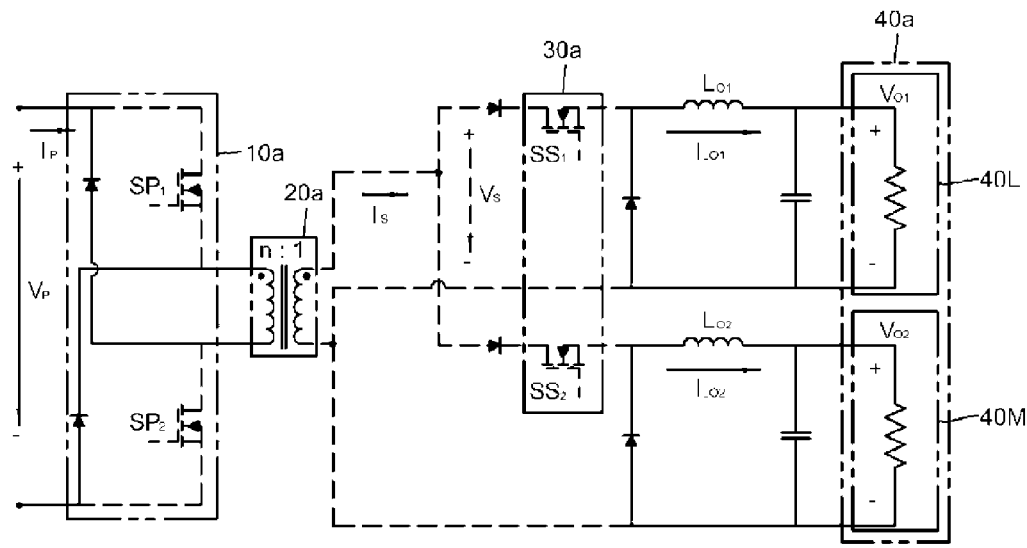
Figure 5:
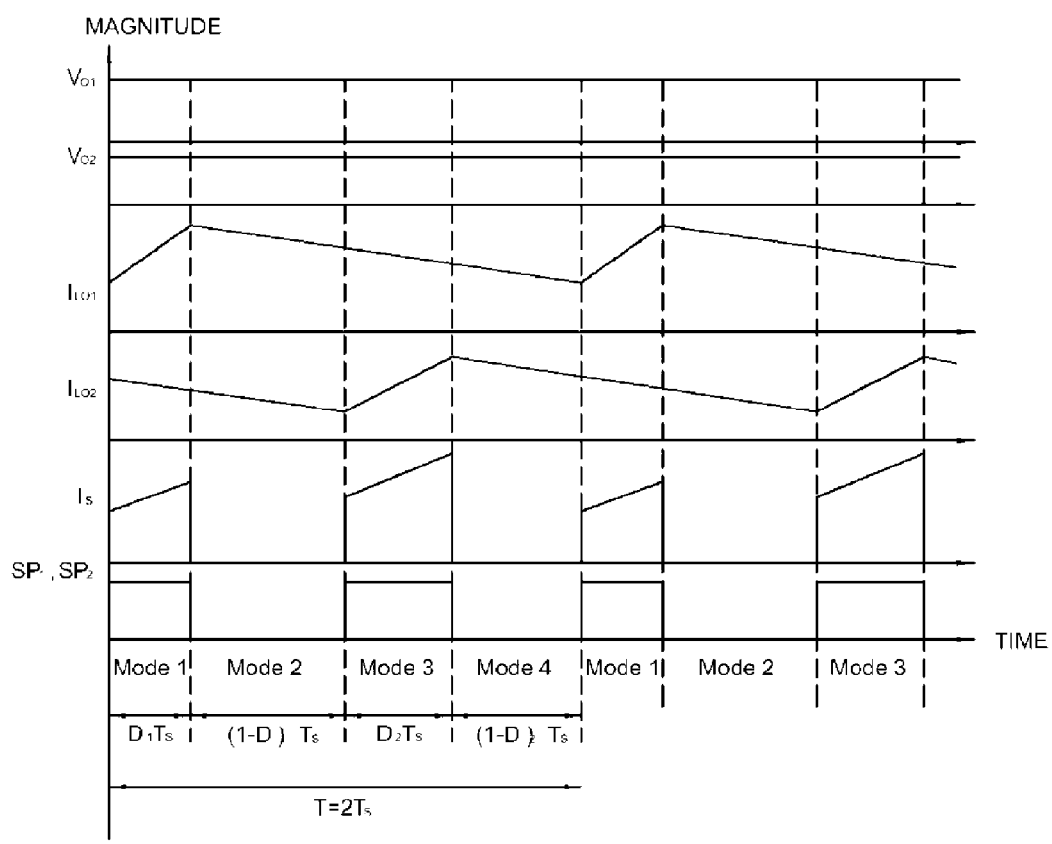
FIG. 5 is a graph illustrating an example of a pulse width modulation signal, a voltage signal, and a current signal according to the operation mode of the multiple output converter shown in FIGS. 4A to 4D.

FIG. 3 is a circuit diagram illustrating a multiple output converter according to an exemplary embodiment of the present invention, FIGS. 4A to 4D are diagrams illustrating an operation mode of the multiple output converter shown in FIG. 3, and FIG. 5 is a graph illustrating an example of a pulse width modulation signal, a voltage signal, and a current signal according to the operation mode of the multiple output converter shown in FIGS. 4A to 4D.

FIG. 3 is a circuit diagram illustrating an example in which the output unit of the multiple output converter shown in FIG. 1 is configured as a double-ended type, and an embodiment of the present invention is not limited to the multiple output converter having the double-ended type.

The multiple output converter 1 may include a power conversion circuit 100a and a control circuit 200a.

The power conversion circuit 100a may include an input unit 10a, a transformer unit 20a, a second switch unit 30a, and an output unit 40a.

The input unit 10a may include first switches $SP_1$ and $SP_2$, and the first switches $SP_1$ and $SP_2$ may include two switches $SP_1$ and $SP_2$. The input unit 10a may receive power through input direct current power, and switch the input direct current power applied by receiving the PWM signal from the control circuit 200a and transmit it to the transformer unit 20a.

The transformer unit 20a may output boosted power by boosting the input power, and include a primary coil and a second coil which have a turns ratio of n:1.

The second switch unit 30a may include two second switches $SS_1$ and $SS_2$ so as to switch the input power applied through the transformer unit 20a and transmit it to the output unit 40a. The two second switches $SS_1$ and $SS_2$ included in the second switch unit 30a may be controlled by a time division multiple control method according to a control signal applied through the control circuit 200a.

The output unit 40a may include two output terminals, and the two output terminals may be connected to each of the second switches $SS_1$ and $SS_2$ provided in the second switch unit 30a and receive an output voltage by the time division multiple control method.

The control circuit 200a may include a feedback circuit unit 230a and a switching control unit 260a.

The feedback circuit unit 230a may detect voltages output from two output terminals of the power conversion circuit 100a, and provide the detected voltages to the switching control unit 260a. The feedback circuit unit 230a may control the voltages output from the two output terminals by the time division multiple control method, transmit each of them to the switching control unit 260a to have time difference, and constantly maintain the output voltage of each of the plurality of output terminals (second output 1, second output 2, ..., second output n) included in the output unit 40a.

The switching control unit 260a may transmit a switching signal to the input unit 10a and the second switch unit 30a of the power conversion circuit 100a, and control a switching operation of each of them.

The switching control unit 260a may control the first switches $SP_1$ and $SP_2$ of the input unit 10a and the second switches $SS_1$ and $SS_2$ of the second switch unit 30a by the time division multiple control method.

Referring to FIGS. 4A to 4D, and 5, the switching control unit 260a may control the first switches $SP_1$ and $SP_2$, and the second switch unit 30a into the steps of mode 1 to mode 4.

Referring to FIGS. 4A and 5, the switching control unit 260a may turn on the first switches $SP_1$ and $SP_2$ using the PWM control in the mode 1, and turn on an upper switch $SS_1$ of the second switch unit 30a and turn off a lower switch $SS_2$.

When the switching control unit 260a turns on the first switches $SP_1$ and $SP_2$, an input direct current power $V_P$ may be applied to the transformer unit 20a. The transformer unit 20a may convert the applied input direct current power $V_P$ according to the turns ratio. The power converted by the transformer unit 20a may be applied to a first output unit 40L through the upper switch $SS_1$, a current $I_S$ output through a second terminal of the transformer unit 20a during a period of the mode 1 may be increased, and a current $I_{LO1}$ may be also increased since the current $I_S$ output through the second terminal flows through a first inductor $L_{O1}$ of the first output unit 40L. The current flowing through the first inductor $L_{O1}$ may be stored in a first capacitor $C_{O1}$, and a voltage of the first output unit 40L may be maintained.

Referring to FIGS. 4B and 5, the switching control unit 260a may turn off the first switches $SP_1$ and $SP_2$ using the PWM control in the mode 2, and turn off both of the upper switch $SS_1$ and the lower switch $SS_2$ of the second switch unit 30a.

Accordingly, currents which are previously stored in the inductors $L_{O1}$ and $L_{O2}$ and the capacitors $C_{O1}$ and $C_{O2}$ may flow to the first output unit 40L and a second output unit 40M, a current output through the transformer unit 20a may be 0, and the currents flowing through the first inductor $L_{O1}$ and the second inductor $L_{O2}$ may be decreased.

Referring to FIGS. 4C and 5, the switching control unit 260a may turn on the first switches $SP_1$ and $SP_2$ using the PWM control in the mode 3, and turn off the upper switch $SS_1$ of the second switch unit 30a and turn on the lower switch $SS_2$.

When the switching control unit 260a turns on the first switches $SP_1$ and $SP_2$, the input direct current power $V_P$ may be applied to the transformer unit 20a. The transformer unit 20a may convert the applied input direct current power $V_P$ according to the turns ratio. The power converted by the transformer unit 20a may be applied to the second output unit 40M through the lower switch $SS_2$, the current $I_S$ output through the second terminal of the transformer unit 20a may be increased during a period the mode 3, a current $I_{LO2}$ flowing through the second inductor $L_{O2}$ of the second output unit 40M may be increased since the current $I_S$ output through the second terminal flows to the second inductor $L_{O2}$ of the second output unit 40M. The current flowing through the second inductor $L_{O2}$ is stored in the second capacitor $C_{O2}$ and used to maintain a voltage of the second output unit 40M.

Referring to FIGS. 4D and 5, the switching control unit 260a may turn off the first switches $SP_1$ and $SP_2$ using the PWM control in the mode 4, and turn off both of the upper switch $SS_1$ of the second switch unit 30a and the lower switch $SS_2$.

Accordingly, the currents which are previously stored in the inductors $L_{O1}$ and $L_{O2}$ and the capacitors $C_{O1}$ and $C_{O2}$ may flow to the first output unit 40L and the second output unit 40M, the current output through the transformer unit 20a may be 0, and the currents flowing through the first inductor $L_{O1}$ and the second inductor $L_{O2}$ may be decreased.

As described above, the primary side of the multiple output converter 1 may be shared, and the plurality of output terminals may be provided in the second side and may be independently controlled by the time division multiple control method by including a switch which can individually be controlled in each output terminal.

While the invention has been shown and described with reference to certain exemplary embodiments thereof, it will be understood by those skilled in the art that various changes in form and details may be made therein without departing from the spirit and scope of the invention as defined by the appended claims.

What is claimed is:

1. A multiple output converter comprising:
   a power conversion circuit including,
      an input unit having at least one first switch,
      a transformer unit configured to convert a magnitude of power from the input unit,
      an output unit having a plurality of output terminals, which are configured to receive the power from the transformer unit, and
      a second switch unit having a plurality of second switches, wherein each of the plurality of second switches is installed in each of the plurality of output terminals, respectively, and is controlled in a time division multiple control manner; and
   a switching control unit configured to transmit a pulse width modulation signal to the at least one first switch and the plurality of second switches for controlling the at least one first switch and the plurality of second switches in the time division multiple control manner,
   wherein the multiple output converter further comprises a feedback circuit unit configured to detect voltages of the plurality of output terminals and to transmit a signal of a level of the voltages to the switching control unit for performing an independent feedback control on the plurality of output terminals in the output unit.

2. The multiple output converter of claim 1, wherein upon receipt of the signal of the level of the voltages of the plurality of output terminals from the feedback circuit unit, the switching control unit controls the at least one first switch and the plurality of second switches in the time division multiple control matter according to the signal of the level of the voltages, and independently compensates power to each of the plurality of output terminals.

3. The multiple output converter of claim 1, wherein the switching control unit performs the time division multiple control by synchronizing the at least one first switch with the plurality of second switches in one sampling period.

4. The multiple output converter of claim 1, wherein the switching control unit is configured to operate the at least one first switch at a frequency fs, and
wherein each of the plurality of second switches, having N-number switches, is operated at a frequency fs/n so that the switching control unit controls all of powers of the plurality of output terminals in the second switch unit over one N-time period.

5. The multiple output converter of claim 1, wherein the plurality of second switches has N-number switches and the switching control unit is configured to control each of the plurality of second switches in a sequential order over a time period Ts, and to independently control each and every one of the plurality of second switches over a N time period nTs.

6. A multiple output converter comprising:
an input unit having at least one first switch;
a transformer unit configured to convert a magnitude of power received from the input unit; and
an output unit having a plurality of output terminals which are configured to receive the power from the transformer unit, wherein each of the plurality of output terminals has each of a plurality of second switches, respectively, and is synchronized with a pulse width modulation (PWM) control signal of the at least one first switch and the plurality of second switches are controlled in a time division multiple control manner,
wherein the multiple output converter further comprises a feedback circuit unit configured to detect a level of the power of each of the plurality of output terminals for independently controlling magnitudes of the power of each of the plurality of output terminals.

7. The multiple output converter of claim 6, wherein the plurality of output terminals in the output unit is connected with the input unit, and an operation of the plurality of second switches determines any one of the plurality of output terminals receiving the power from the transformer unit.

8. A multiple output converter comprising:
a power conversion circuit including,
an input unit having at least one first switch,
a transformer unit configured to convert a magnitude of power from the input unit,
an output unit having a plurality of output terminals, which are configured to receive the power from the transformer unit, and
a second switch unit having a plurality of second switches, wherein each of the plurality of second switches is installed in each of the plurality of output terminals, respectively, and is controlled in a time division multiple control manner; and
a switching control unit configured to transmit a pulse width modulation signal to the at least one first switch and the plurality of second switches for controlling the at least one first switch and the plurality of second switches in the time division multiple control manner,
wherein the switching control unit is configured to operate the at least one first switch at a frequency fs, and
wherein each of the plurality of second switches, having N-number switches, is operated at a frequency fs/n so that the switching control unit controls all of powers of the plurality of output terminals in the second switch unit over one N-time period.

* * * * *